(12) United States Patent
Zang et al.

(10) Patent No.: US 8,305,894 B1
(45) Date of Patent: Nov. 6, 2012

(54) PAGING CHANNEL QUEUE MANAGEMENT BASED ON LOAD

(75) Inventors: Hui Zang, Burlingame, CA (US); Jean C. Bolot, Mountain View, CA (US); Jeremy Serror, Paris (FR)

(73) Assignee: Sprint Spectrum L.P., Overland Park, KS (US)

( * ) Notice: Subject to any disclaimer, the term of this patent is extended or adjusted under 35 U.S.C. 154(b) by 1434 days.

(21) Appl. No.: 11/499,518

(22) Filed: Aug. 4, 2006

(51) Int. Cl.
*G06F 11/00* (2006.01)
(52) U.S. Cl. ........................................................ 370/232
(58) Field of Classification Search .................. 370/332, 370/230.1, 232–234; 718/102–105
See application file for complete search history.

(56) References Cited

U.S. PATENT DOCUMENTS

| | | | |
|---|---|---|---|
| 6,185,421 B1 * | 2/2001 | Alperovich et al. | 455/433 |
| 6,289,227 B1 * | 9/2001 | Shi | 455/574 |
| 7,317,706 B1 * | 1/2008 | Hao et al. | 370/330 |
| 2001/0034233 A1 | 10/2001 | Tiedemann, Jr. et al. | |
| 2004/0002340 A1 * | 1/2004 | Lim et al. | 455/450 |
| 2004/0252669 A1 * | 12/2004 | Hosein | 370/342 |
| 2005/0164718 A1 * | 7/2005 | Rajkotia et al. | 455/458 |
| 2007/0232330 A1 * | 10/2007 | Ranganathan | 455/458 |

FOREIGN PATENT DOCUMENTS

WO  WO 01/47287  *  6/2001

* cited by examiner

*Primary Examiner* — Anh-Vu Ly
*Assistant Examiner* — Mang Yeung

(57) ABSTRACT

A method and apparatus for more efficiently scheduling transmission of page messages over a paging channel in a radio access network (RAN). The RAN, which generally assigns slotted messages a higher transmission priority than non-slotted messages, may determine a level of occupancy of the paging channel either periodically, continuously, or responsive to a triggering event. Thereafter, the RAN may compare the level of occupancy to a load threshold, which may either be based on (i) a predicted probability of non-slotted messages that will result from slotted messages in the RAN, or (ii) a ratio of non-slotted messages to slotted messages in the RAN. If the load threshold is based on the ratio, the RAN may determine the load threshold before making the comparison. After making the comparison, the RAN may assign non-slotted messages a higher transmission priority than slotted messages if the level of occupancy exceeds the load threshold.

17 Claims, 6 Drawing Sheets

PAGING CHANNEL QUEUE MANAGEMENT BASED ON LOAD

FIELD OF THE INVENTION

The present invention relates to wireless communications, and more particularly to the scheduling of message transmission on a paging channel of a wireless communication network.

DESCRIPTION OF RELATED ART

The art and popularity of wireless communications has grown significantly over recent years. Indeed, millions of people are engaging in voice and data communications using mobile stations such as cellular telephones and Personal Digital Assistants (PDAs). In principle, a user can communicate over the Internet or call anyone over the Public Switched Telephone Network (PSTN) from any place inside the coverage area of a wireless communication network.

In a typical wireless communication network, an area is divided geographically into a number of cells and cell sectors, each defined by a radio frequency (RF) radiation pattern from a respective base transceiver station (BTS). Within each cell sector, the BTS's RF radiation pattern provides an air interface through which mobile stations may communicate with the BTS. The BTSs in the cells in turn couple to a base station controller (BSC), which then couples to a telecommunications switch or gateway, such as a mobile switching center (MSC) or packet data serving node (PDSN) for instance. The switch or gateway may then couple to a transport network, such as a public switched telephone network (PSTN) or a packet-switched network (e.g., the Internet). Conveniently with this arrangement, when a mobile station is positioned within a given cell sector, the mobile station can communicate with entities on the transport network via a communication path comprising the RF air interface, the BTS, the BSC, the switch or gateway, and the transport network. The combination of network entities that provides a connection between the mobile station and the transport network may be considered a radio access network (RAN).

The RF air interface of any given cell sector is typically divided into a plurality of channels for carrying communications between the mobile stations and the BTS. For example, the RF air interface may include (i) a plurality of forward-link channels (e.g., pilot channels, sync channels, paging channels, and forward-traffic channels) for carrying communications from the BTS to the mobile stations, and (ii) a plurality of reverse-link channels (e.g., access channels and reverse-traffic channels) for carrying communications from the mobile stations to the BTS.

A paging channel of the RF air interface is typically used for signaling mobile stations, setting up communications with mobile stations, and delivering small messages to mobile stations. Mobile stations that are in dormant mode (i.e. not assigned a traffic channel) monitor the paging channel periodically in order to reduce power consumption. In a Code Division Multiple Access (CDMA) wireless communication network, the paging channel is typically divided into a number of time slots (e.g., 32 or 64 slots) of a specific duration (e.g., 80 ms) per cycle, and dormant mobile stations may only monitor the paging channel for one time slot per cycle. If a dormant mobile station detects a paging message (e.g., a General Page Message (GPM)) with its identifier during that time slot, the mobile station may exit dormant mode, send a reply (e.g., Page Response Message (PRM)) to the RAN, and begin continuously monitoring the paging channel for a fixed period of time. In turn, the RAN may send subsequent paging messages to the mobile station (e.g., an acknowledgement message (ACK), a channel assignment message (CAM), data burst message (DBM)) to complete the paging process. However, if the mobile station does not receive subsequent paging messages from the RAN during that fixed period of time, the mobile station may transition back into dormant mode.

The paging messages that the RAN may send to the mobile station are divided into two types: slotted messages and non-slotted messages. Slotted messages are paging messages that the RAN will send in designated time slots of the paging channel and the mobile station may receive while monitoring its time slot in dormant mode (e.g. GPMs). Non-slotted messages are paging messages that the RAN may send in any time slot of the paging channel and the mobile station may receive while continuously monitoring the paging channel after exiting dormant mode (e.g., ACKS, CAMs, and DBMs). Typically, the RAN in a CDMA wireless communication network will store each slotted message in a queue that is keyed to the slotted message's associated time slot, and the RAN will store all non-slotted messages together in a single non-slotted queue. (E.g., if there are 32 time slots in the paging channel, there will be 32 slotted message queues and 1 non-slotted message queue). When sending these messages, the RAN typically assigns slotted messages a higher priority than non-slotted messages, in order to maintain a low call setup delay. Thus, for any given time slot of the paging channel, the RAN will first transmit any slotted messages stored in the queue associated with that time slot, and the RAN will then transmit one or more non-slotted messages if there is any time remaining in the time slot.

The wireless communication network described above, and specifically the paging channel, may be vulnerable to an overload condition caused by an excessive number of slotted messages in the network (e.g., a storming event). When an excessive number of slotted messages exist in the slotted queues of the RAN, the RAN may continuously send the higher priority slotted messages to mobile stations without sending subsequent non-slotted messages (or sending them after a long delay). However, non-slotted messages are the messages that complete the paging process and establish a real communication (e.g., voice call, data session, Short Message Service (SMS)) with the mobile station. Thus, when the RAN does not send non-slotted messages in a timely manner, those messages may be dropped from the network and the RAN may not establish a real communication with mobile stations being paged. In turn, this overload condition on the paging channel may degrade the overall performance of the network. Accordingly, a wireless communication network that more efficiently schedules the transmission of slotted and non-slotted messages on the paging channel would be desirable.

SUMMARY

The present invention advances over the existing art by providing an improved method and apparatus for scheduling the transmission of page messages over a paging channel in a radio access network (RAN) based on the level of occupancy of the paging channel.

One exemplary embodiment of the present invention may take the form of a method for scheduling transmission of slotted messages and non-slotted messages on a paging channel defined by a RAN, wherein the RAN generally assigns slotted messages a higher transmission priority than non-slotted messages. According to the method, the RAN may first determine a level of occupancy of the paging channel. In the preferred embodiment, the RAN will determine the level of occupancy of slotted messages only. Thereafter, the RAN may compare the level of occupancy to a load threshold. The load threshold may be based on a predicted probability of non-slotted messages that will result from slotted messages transmitted over the paging channel, which is static, or a ratio of non-slotted messages to slotted messages in the RAN, which is dynamic. If the load threshold is based on the ratio of non-slotted messages to slotted messages, the RAN may determine the load threshold before comparing the level of occupancy to the load threshold. Once the comparison is made, the RAN may assign non-slotted messages a higher transmission priority than slotted messages if the level of occupancy exceeds the load threshold. As such, if the paging channel comprises of plurality of time slots of a given duration, the RAN may function to first (i) transmit any non-slotted messages during the duration of a given time slot, and then (ii) transmit slotted messages associated with the given time slot during the duration of the given time slot if all non-slotted messages have been transmitted.

Another exemplary embodiment of the present invention may take the form of a base transceiver station (BTS) comprising (i) an antenna structure for communicating with endpoints via an air-interface, (ii) a base station controller interface for communicating with a base station controller, (iii) a processor, (iv) data storage; and (v) program instructions stored in the data storage and executable by the processor. Further, the program instructions may carry out functions of the method described above, including (i) determining a level of occupancy of a paging channel defined by the BTS, (ii) comparing the level of occupancy to a load threshold, and (iii) assigning non-slotted messages a higher transmission priority than slotted messages if the level of occupancy exceeds the load threshold.

Yet another exemplary embodiment of the present invention may take the form of a BTS comprising (i) an antenna structure for communicating with endpoints via an air-interface, (ii) a base station controller interface for communicating with a base station controller, (iii) a processor, (iv) data storage; and (v) an enhanced scheduler, wherein the enhanced scheduler functions to (i) determine a level of occupancy of a paging channel defined by the BTS, (ii) compare the level of occupancy to a load threshold, and (iii) assign non-slotted messages a higher transmission priority than slotted messages if the level of occupancy exceeds the load threshold.

Advantageously, the present invention assigns a higher transmission priority to non-slotted messages—typically the messages that complete the paging process and establish a real communication—when the level of occupancy of slotted messages on the paging channel increases to a critical point (i.e. the load threshold). This may prevent slotted messages from overloading the paging channel of the network and decreasing the overall performance of the network, while still maintaining an acceptable call setup delay.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
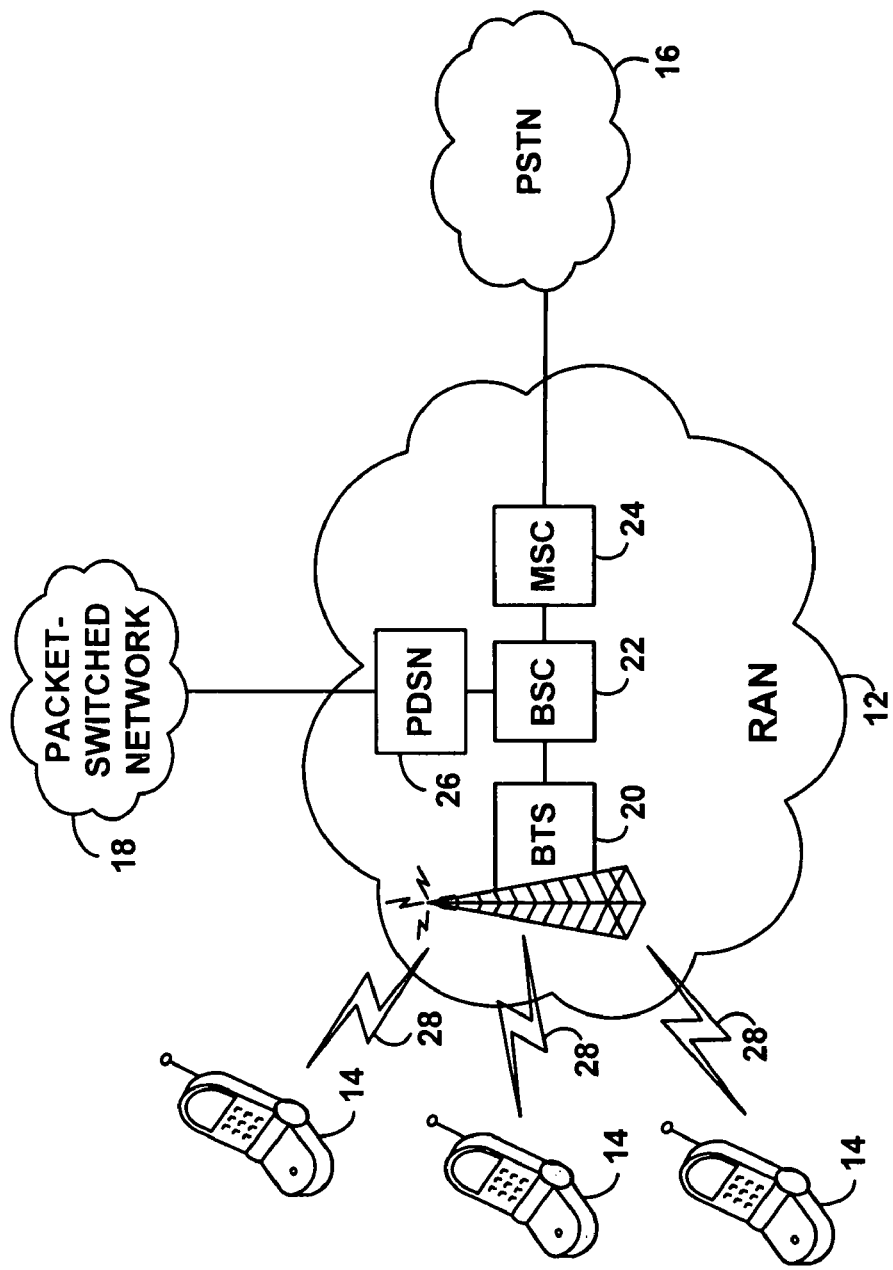
FIG. 1 is a simplified block diagram of a cellular wireless communication network arranged to carry out an exemplary embodiment of the present invention.

Referring to the drawings, FIG. 1 is a simplified block diagram of a cellular wireless communication network 10 arranged to carry out an exemplary embodiment of the present invention. As shown, the network 10 includes at its core a radio access network (RAN) 12, which may function to provide connectivity between one or more mobile stations 14 (e.g., a cell phone, PDA, or other wirelessly-equipped device), and one or more transport networks, such as a public switched telephone network (PSTN) 16 or a packet-switched network (e.g., the Internet) 18. The RAN 12 may comprise, among other entities, a base transceiver station (BTS) 20, a base station controller (BSC) 22, a mobile switching center (MSC) 24, and a packet data serving node (PDSN) 26.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

As shown in FIG. 1, the BTS 20 may function to transmit one or more radio frequency (RF) radiation patterns, each of which may define a given wireless coverage area such as a cell or cell sector. Within each given wireless coverage area, the BTS's RF radiation pattern provides an air interface 28 through which the mobile stations 14 may communicate with the BTS 20 of the RAN 12. The BTS 20 typically couples to the BSC 22, which may function to communicate with the BTS 20 and control aspects of the BTS 20 as well as aspects of the wireless communication over the air interface 28. In turn, the BSC 22 typically couples to the MSC 24, which may provide connectivity with the PSTN 16, and the BSC 22 also typically couples to the PDSN 26, which may provide connectivity with the packet-switched network 18. The PSTN 16 is a circuit-switched network that establishes a dedicated communication path for use during a communication session, whereas the packet-switched network 18 communicates data in the form of packets, with no previously-established communication path. The connections between the entities of the RAN 12, other than the air interface 28, may include physical cables, such as T1 trunk lines or E1 trunk lines, and/or wireless links, such as microwave links or satellite channels.

The air interface 28 may carry communications between the BTS 20 and mobile stations 14 according to any of a variety of protocols. For instance, the air interface communications may be analog communications compliant with the Advanced Mobile Phone Service (AMPS) protocol or may be digital communications compliant with the Code Division Multiple Access (CDMA) (e.g., EV-DO, 1xRTT, etc.), Time Division Multiple Access (TDMA), Global System for Mobile Communication (GSM) or 802.11 protocols. For illustration, this specification will assume the communications are compliant with CDMA, as defined by TIA/EIA/IS-95 and IS-2000 (CDMA2000), which are well known to those of ordinary skill in the art.

The air interface 28 is typically divided into a plurality of channels for carrying communications between the mobile stations 14 and the BTS 20. For example, the air interface 28 may include a plurality of forward-link channels for carrying communications from the BTS 20 to the mobile stations 14, such as pilot channels, sync channels, paging channels, and forward-traffic channels. Additionally, the air interface 28 may include a plurality of reverse-link channels for carrying communications from the mobile stations 14 to the BTS 20, such as access channels and reverse-traffic channels. The channels of the air interface 28 may be distinguished by digital modulation codes known as "Walsh codes".

The paging channel of the air interface 28 primarily functions to carry paging messages to mobile stations 14 in dormant mode, set up communications with mobile stations 14, and deliver small messages to mobile stations 14. The paging channel of the air interface 28 may be divided into time slots of a specific duration (e.g., 80 ms), and a specific number of consecutive time slots (e.g., 32 or 64) may then be grouped into cycles. These time slots function such that a mobile station 14 in dormant mode need only monitor the paging channel at one specific time slot during each cycle (e.g., the $2^{nd}$ time slot in each 32-slot cycle) to determine whether the RAN 12 is attempting to page the mobile station 14, thus reducing power consumption. Typically, a mobile station 14 determines which time slot to monitor based on a hash function of its International Mobile Station Identifier (IMSI). The RAN 12, in turn, may only send slotted messages (e.g., General Paging Messages (GPMs)) to a mobile station 14 in dormant mode (i.e. slotted mode) once per cycle, and only during the mobile station's specific time slot within each cycle. On the other hand, the RAN 12 may send non-slotted messages (e.g., acknowledgement messages (ACKs), channel assignment messages (CAMs), and data burst message (DBMs)) to a mobile station 14 that has exited dormant mode (i.e. is now in the non-slotted mode) during any available time slot of the paging channel.

Figure 2:
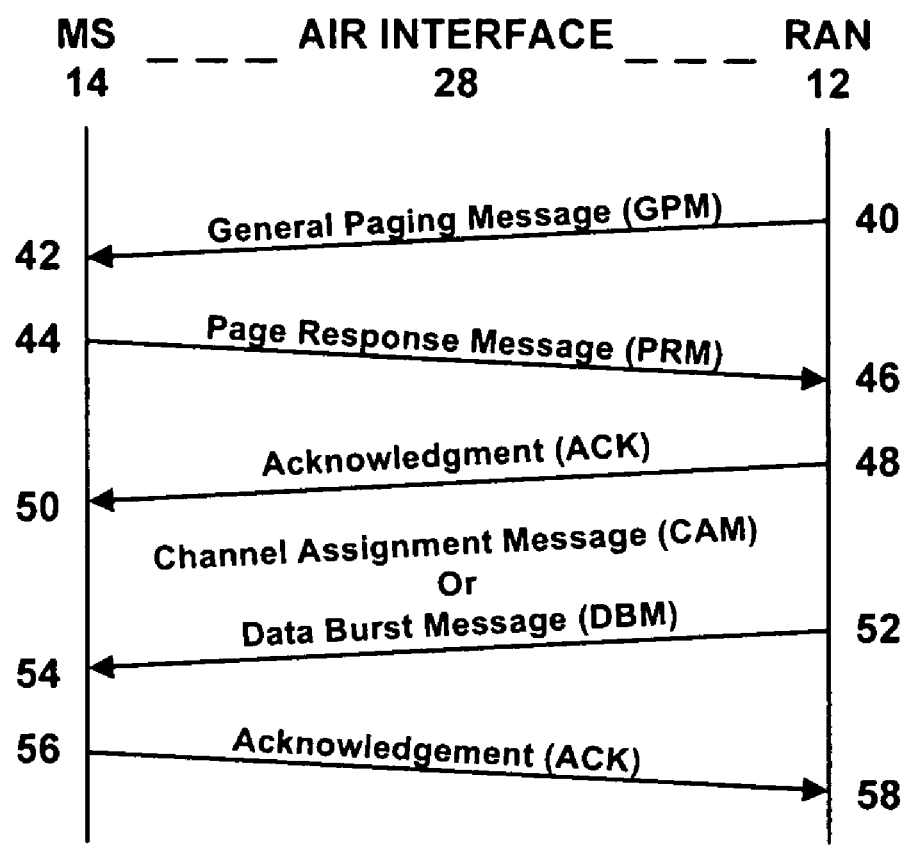
FIG. 2 illustrates an exemplary paging message flow diagram for setting up a call with a mobile station in dormant mode via a radio access network.

FIG. 2 illustrates an exemplary paging message flow diagram for setting up a call with a mobile station 14 in dormant mode via the RAN 12. (As used in this specification, the term "call" may be used interchangeably with the term "communication"). The call setup in FIG. 2 is conducted over a paging channel and an access channel according to a CDMA protocol.

The RAN 12 may initiate the call set up with the mobile station 14 after receiving a request from an endpoint to set up a call of a particular type (e.g., voice, data, Short Message Service (SMS)) with the mobile station 14. At step 40, after receiving the request, the RAN 12 may first generate a GPM containing an identifier of the mobile station 14 (e.g., Mobile Identification Number (MIN), International Mobile Station Identifier (IMSI), point code, etc.). If the RAN 12 has also received page requests for other mobile stations that share the same time slot as mobile station 14, the GPM may also contain identifiers of those other mobile stations. Typically, the GPM may contain a maximum of eight or nine mobile station identifiers. Once the RAN 12 generates the GPM for the mobile station's 14 time slot, the RAN 12 may broadcast the GPM to one or more wireless coverage areas (via one or more air interfaces) during the mobile station's time slot in one of the paging channel cycles. In turn, at step 42, the mobile station 14, while in dormant mode, may detect the GPM containing its identifier while monitoring its time slot on the paging channel of the air interface 28. In response, at step 44, the mobile station 14 may (i) generate and transmit a Page Response Message (PRM) to the RAN 12 (via the access channel of the air interface 28) indicating the mobile station's availability to receive the call, and (ii) exit dormant mode and begin monitoring the paging channel continuously.

At step 46, the RAN 12 may receive the PRM from the mobile station 14 via the access channel of the air interface 28, and at step 48, the RAN 12 may responsively generate and transmit an ACK to the mobile station 14 during any available time slot of the paging channel, which the mobile station 14 may receive at step 50. Thereafter, at step 52, the RAN 12 may assign the mobile station 14 a traffic channel by generating and transmitting a CAM to the mobile station 14 (via the air interface 28) during any available time slot. Alternatively, if the RAN 12 is setting up an SMS call at Step 52, the RAN 12 may send the content of the SMS communication by generating and sending a DBM to the mobile station 14 during any available time slot. Finally, at step 54, the mobile station 14 may receive the CAM or DBM from the RAN 12 via the air interface 28. If the message is the CAM, the mobile station 14 may responsively tune to the assigned traffic channel and begin communicating with the endpoint that initiated the call via the assigned traffic channel of the air interface 28 and the RAN 12. Alternatively, if the message is the DBM, the mobile station 14 may provide the content of the DBM to a user of the mobile station 14. At step 56, the mobile station 14 may then transmit an ACK to the RAN 12 via the air interface 28. In either case, the paging process is typically complete after the RAN 12 receives the ACK.

Figure 3:
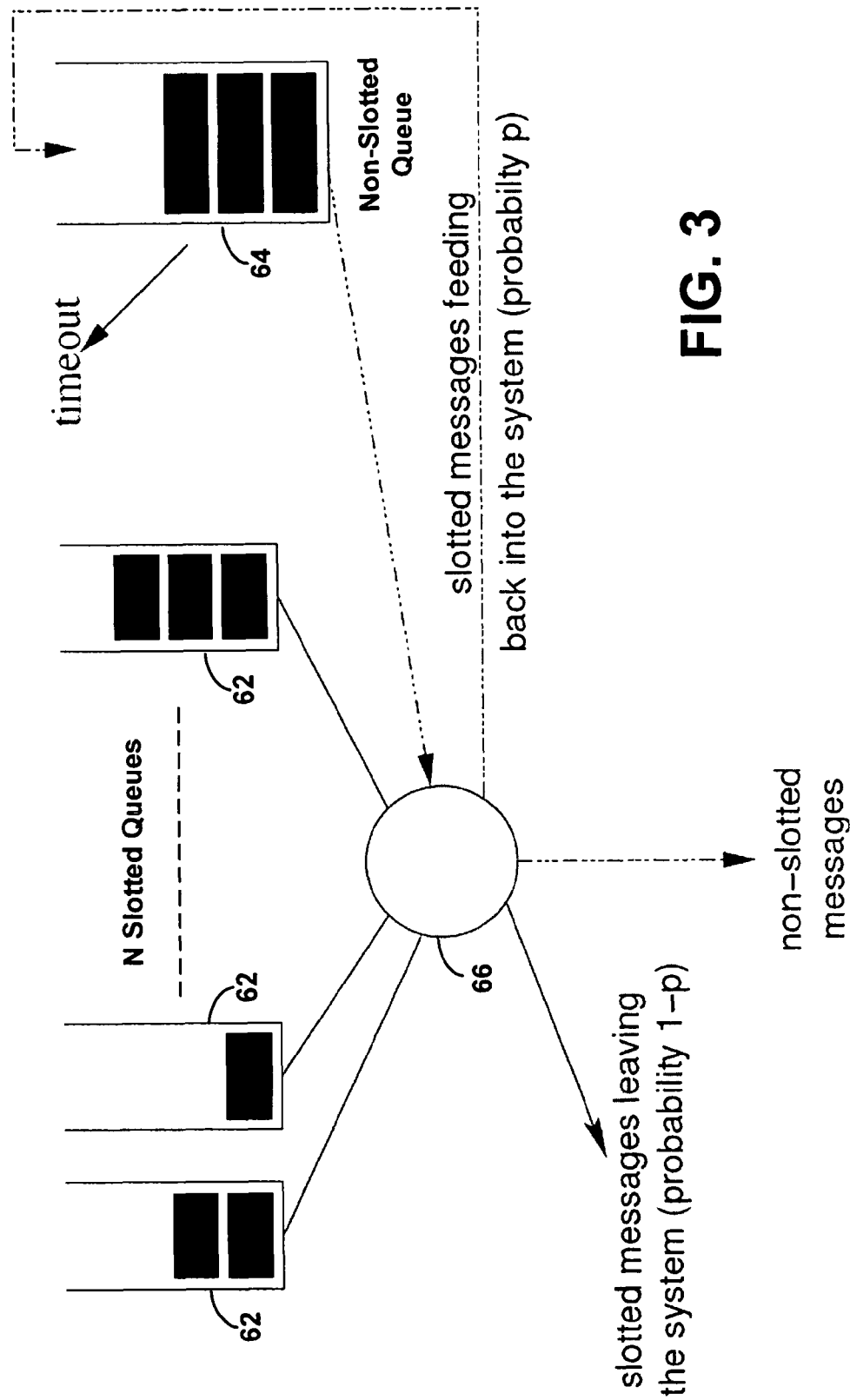
FIG. 3 illustrates an exemplary queuing system for handling page messages in the radio access network.

In order to carry out call setups over the paging channel as described with reference to FIG. 2, the RAN 12 may include a queuing system to handle page messages, such as slotted messages (e.g., GPM) and non-slotted messages (e.g., ACK, CAM, DBM), prior to transmission. FIG. 3 illustrates an exemplary queuing system 60 for handling page messages in the RAN 12. As shown in FIG. 3, the queuing system 60 may include N slotted queues 62 and one non-slotted queue 64, all of which may be served by a scheduler 66. The number of slotted queues N is preferably equal to the number of time slots in each paging channel cycle (e.g., 32 or 64), and each of the slotted queues 62 preferably corresponds to one specific time slot. As such, when the RAN 12 receives or generates a slotted message that corresponds to a specific time slot (e.g., a GPM), the RAN 12 may store the slotted message in the slotted queue 62 that corresponds to the time slot. Similarly, when the RAN 12 receives or generates a non-slotted message that may be sent during any available time slot, the RAN 12 may store the non-slotted message in the non-slotted queue 64 together with all other non-slotted messages in the RAN 12.

The scheduler 66 of the queuing system 60 may then function to schedule the transmission of the page messages over the paging channel to the mobile stations 14. A typical scheduler 66 carries out this function by assigning slotted messages in the slotted queues 62 a higher priority than non-slotted messages in the non-slotted queue 64. Accordingly, during the duration of any given time slot of the paging channel, the typical scheduler 66 may first serve any slotted messages in the slotted queue 62 corresponding to that given time slot. If the duration of that given time slot elapses before the typical scheduler 66 serves all of the slotted messages in the corresponding slotted queue 62, the scheduler 66 may not serve any non-slotted messages in the non-slotted queue 64 during the given time slot. Alternatively, if there are no slotted messages in the slotted queue 62 or the typical scheduler 66 serves all of the slotted messages in the slotted queue 62 before the duration of the given time slot elapses, the scheduler 66 may then serve non-slotted messages from the non-slotted queue 64 until the end of the given time slot. Alternatively yet, if the typical scheduler 66 serves all of the slotted messages in the slotted queue 62 and all of the non-slotted messages in the non-slotted queue 64 before the duration of the given time slot elapses, the scheduler 66 may then remain idle until the end of the given time slot. In any case, once the duration of the given time slot elapses, the typical scheduler 66 may then transition to the next consecutive time slot and begin serving the slotted queue 62 corresponding to the next time slot according to same process.

In the network 10, slotted messages typically initiate a paging process with a mobile station 14, whereas non-slotted messages typically complete the paging process and establish a real communication (e.g., voice, data, SMS) between the RAN 12 and the mobile station 14. For example, as shown in FIG. 2, the slotted GPM initiated the call setup with the mobile station 14, but the non-slotted ACK and CAM (or DBM) completed the call set up and perhaps connected the mobile station 14 with another endpoint via the RAN 12. However, if the RAN 12 receives or generates a large number of slotted messages (e.g., GPMs), the queuing system 60 of FIG. 3 may continually serve only slotted messages from the slotted queues 62, without serving any non-slotted messages from the non-slotted queue 64 (or only after a long delay). Non-slotted messages that the queuing system 60 does not serve in a timely manner may either (i) get dropped by the RAN 12 after a certain period of time, or (ii) get lost after transmission by the RAN 12 because the mobile station 14 has transitioned back into dormant mode. In either case, the large number of slotted messages in the RAN 12 may limit the ability of the RAN 12 to establish real communications with the mobile stations 14 via the paging channel. In turn, the performance of the network 10 may suffer.

The exemplary embodiments of the present invention may help to avoid this potential decrease in network performance by temporarily assigning a higher transmission priority to non-slotted messages when a level of occupancy on the paging channel exceeds a load threshold. In order to carry out the invention, the RAN 12 will preferably include a queuing system similar to the one described above with reference to FIG. 3. However, the scheduler of the queuing system in the present invention will operate in two modes: standard mode and overload mode. In standard mode (the default mode), the scheduler of the present invention will serve queued page messages according to the process described above with reference to FIG. 2. However, if the queuing system of the present invention determines that the level of occupancy on the paging channel exceeds the load threshold, the scheduler will temporarily transition into overload mode.

In overload mode, the scheduler of the present invention will assign non-slotted messages a higher priority than slotted messages. Accordingly, during the duration of any given time slot of the paging channel, the scheduler in overload mode will first serve any non-slotted messages in the system. If the duration of that given time slot elapses before the scheduler serves all of the non-slotted messages, the scheduler will not serve any slotted messages during the given time slot. Alternatively, if there are no non-slotted messages in the system or the scheduler in overload mode serves all of the non-slotted messages before the duration of the given time slot elapses, the scheduler may then serve any slotted messages corresponding to the given time slot until the end of the time slot. In either case, once the duration of the given time slot elapses, the scheduler in overload may then transition to the next consecutive time slot and begin serving non-slotted messages at a higher priority than slotted messages. However, if the queuing system determines that the level of occupancy of the paging channel no longer exceeds the load threshold at any point during overload mode, the scheduler of the present invention will transition back into standard mode and once again begin serving slotted messages at a higher priority. Advantageously, the present invention may help prevent slotted messages from overloading the paging channel of the network 10 and decreasing the overall performance of the network 10, while still maintaining an acceptable call setup delay.

Figure 4:
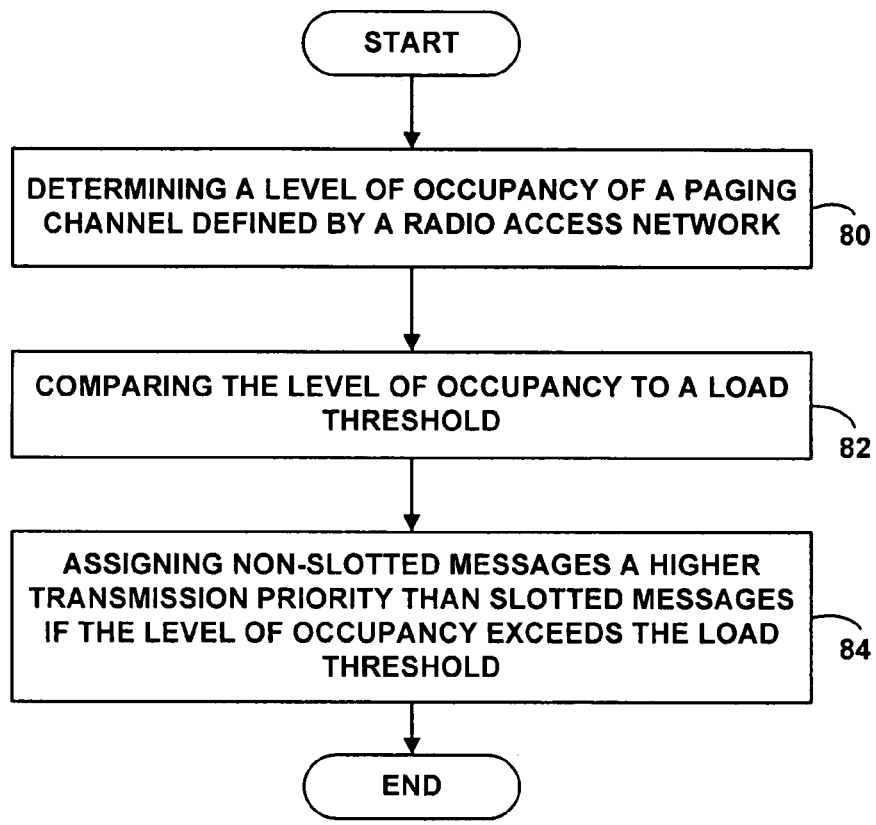
FIG. 4 is a flow chart depicting functionality of the radio access network in accordance with an exemplary embodiment of the present invention.

FIG. 4 is a flow chart depicting functionality of the RAN 12 in accordance with an exemplary embodiment of the present invention. The RAN 12 described in FIG. 4 defines a paging channel and generally assigns slotted messages (e.g., GPMs) a higher transmission priority on the paging channel than non-slotted messages (e.g., ACKs, CAMs, DBMs). As such, if the paging channel comprises of plurality of time slots of a given duration, the RAN 12 may generally function to (i) first transmit any slotted messages associated with a given time slot during the duration of the given time slot, and (ii) then transmit non-slotted messages during the duration of the given time slot if all slotted messages associated with the given time slot have been transmitted.

At block 80, the RAN 12 may determine a level of occupancy of the paging channel defined by the RAN 12. The RAN 12 may determine the level of occupancy periodically, continuously, or in response to a triggering event. Further, the RAN 12 will preferably determine the level of occupancy of slotted messages only, but the RAN 12 may alternatively determine the level of occupancy of all page messages, or non-slotted messages only. In any case, the RAN 12 may determine the level of occupancy in a preferred embodiment by (i) determining a current transmission rate (e.g., kilobits per second or messages per second) of message data of a given type (e.g., all page messages, slotted only, non-slotted only) over the paging channel, (ii) determining a maximum transmission rate (e.g., kilobits per second) over the paging channel, and (iii) computing the ratio of the current transmission rate to the maximum transmission rate. However, other methods for determining the level of occupancy may also be possible.

In determining the level of occupancy, the RAN 12 may determine the current transmission rate of the message data of the given type in a variety of ways. For example, the RAN 12 may define a measurement period (e.g., measured in seconds), monitor the amount of message data of the given type transmitted over the paging channel during the measurement period (e.g., measured in kilobits or messages), and divide that amount by the measurement period. As another example, the RAN 12 may (i) define a measurement period, (ii) monitor the amount of message data of a given type transmitted during each measurement period for a specific number of consecutive measurement periods, (iii) compute the average amount of message data of the given type transmitted during the measurement period, and (iv) divide the average by the measurement period. Other methods for determining the current transmission rate of message data of the given type may be possible as well.

The RAN 12 may also determine the maximum transmission rate of the paging channel in a variety of ways. For example, the RAN 12 may refer to a value pre-programmed in data storage 108 that represents the maximum transmission rate of the paging channel of the RAN 12. Alternatively, the RAN 12 may determine the maximum amount of data (e.g., measured in kilobits or messages) that can be transmitted over the paging channel during a specific duration of time (e.g., measured in seconds) and then divide the maximum amount of data by the duration of time. Other methods for determining the maximum transmission rate over the paging channel may be possible as well.

At block 82, after determining the level of occupancy, the RAN 12 may then compare the level of occupancy to a load threshold. In one implementation, the load threshold may be based on a predicted probability (P) of non-slotted messages that will result from slotted messages transmitted over the paging channel. For example, the load threshold (LT) may comprise an inverse of the summation of the predicted probability (P) and a value of one (i.e., $LT=1/(P+1)$). In this implementation, the load threshold will remain static regardless of the number of slotted and non-slotted messages in the system at any point in time. In another implementation, the load threshold may be based on a ratio (R) of non-slotted messages to slotted messages in the RAN 12, and the RAN 12 may need to determine the load threshold before comparing level of occupancy to the load threshold at block 82. For example, before comparing the level of occupancy to the load threshold, the RAN 12 may determine the load threshold (LT) by computing the ratio (R) of non-slotted messages to slotted messages in the RAN 12 and then computing an inverse of the summation of the ratio (R) with a value of one (i.e., $LT=1/(R+1)$). In this implementation, the load threshold will be dynamic and may change depending on the ratio of non-slotted messages to slotted messages existing in the RAN 12.

The RAN 12 may compute the ratio of non-slotted messages to slotted messages in a variety of ways. As one example, the RAN 12 may compute the ratio by measuring the ratio of non-slotted messages to slotted messages at any single point in time and then using the measured ratio as the computed ratio. The RAN 12 may take the measurement periodically (e.g., every 5 seconds), continuously, or in response to a triggering event (e.g., whenever the RAN 12 determines the load threshold). As another example, the RAN 12 may compute the ratio by measuring the ratio periodically (e.g., every 5 seconds) and calculating the weighted running average of the ratio at each point of measurement. As such, the computed ratio for any measurement point may equal (1−a) *(the instantaneous ratio of non-slotted messages to slotted messages at the measurement point)+(a)*(the computed ratio at the previous measurement point), where (a) is a float number between 0 and 1. As yet another example, the RAN 12 may compute the ratio by measuring the ratio periodically (e.g., every 5 seconds) and calculating the average of the measured ratios over a predetermined number of measurement points. Other methods for computing the ratio of non-slotted messages to slotted messages in the RAN 12 may be possible as well.

At block 84, after comparing the level of occupancy to the load threshold, the RAN 12 may assign non-slotted messages a higher transmission priority than slotted messages if the level of occupancy exceeds the load threshold. As such, if the paging channel comprises of plurality of time slots of a given duration, the RAN 12 may function to first (i) transmit any non-slotted messages during the duration of a given time slot, and then (ii) transmit slotted messages associated with the given time slot during the duration of the given time slot if all non-slotted messages have been transmitted.

Figure 5:
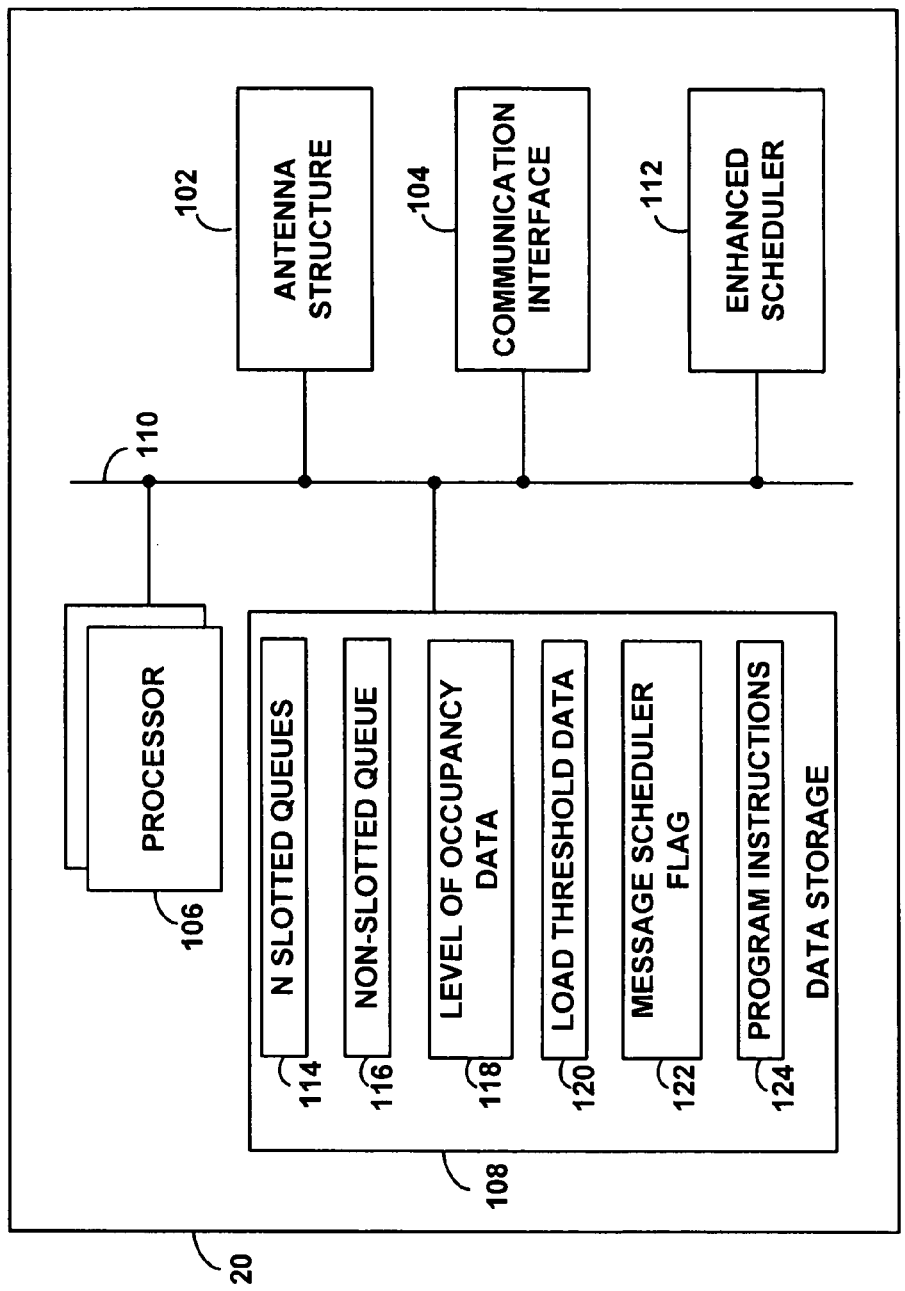
FIG. 5 is a simplified block diagram of a base transceiver station arranged to carry out an exemplary embodiment of the present invention.

The functionality of the present invention may be implemented in one or more entities of the RAN 12, including but not limited to the BTS 20, the BSC 22, and/or the MSC 24. In the preferred embodiment, however, the BTS 20 may carry out the functions of the present invention because the BTS 20 defines the paging channel. Accordingly, FIG. 5 is a simplified block diagram of a BTS 20 arranged to carry out an exemplary embodiment of the present invention. The BTS 20 may comprise an antenna structure 102, a BSC interface 104, a processor 106, and data storage 108, all linked together via a system bus, network, or other connection mechanism 110. In addition, the BTS 20 may also include an enhanced scheduler 112, or the enhanced scheduler functionality may be integrated with processor 106 and/or data storage 108.

Referring to FIG. 5, the antenna structure 102 of the BTS 20 may provide a means for communicating with the mobile stations 14 over the air interface 28. For example, the antenna structure 102 may receive communications from the BSC interface 104 (via other components of the BTS 20) and responsively transmit the communication over the air interface 28, or the antenna structure 102 may receive communications over the air interface 28 and responsively send the communication to the BSC interface 104 (via other components of the BTS 20). The antenna structure 102 may be arranged in various ways. For example, the antenna structure 102 may include one or more antennas. In one respect, the one or more antennas may include one or more omni-directional antennas and/or one or more directional (e.g., sectored) antennas. In another respect, the one or more antennas may include one or more antennas for receiving RF signals and one or more antennas for transmitting RF signals away from the antenna structure 102. The RF signals transmitted away from the antenna structure 102 may provide one or more air interfaces 28 (which define a corresponding wireless coverage area), each of which may comprise a plurality of channels (including time divided paging channels) as described above with reference to FIG. 1.

The processor 106 may comprise one or more general purpose microprocessors and/or dedicated signal processors. (The term "processor" encompasses either a single processor or multiple processors that could work in combination.) Data storage 108, in turn, may comprise memory and/or other storage components, such as optical, magnetic, organic or other memory or disc storage, which can be integrated in whole or in part with the processor 106. Alternatively, data storage 108 may be remote from the processor 106 and coupled to the processor 106 by the connection mechanism 110.

Data storage 108 preferably contains or is arranged to contain, for each paging channel defined by the BTS 20, (i) N slotted queues 114, (ii) one non-slotted queue 116, (iii) level of occupancy data 118, (iv) load threshold data 120, (v) a message scheduler flag 122, and (v) program instructions 124. As such, although FIG. 5 only illustrates one set of these data storage elements, data storage 108 may contain multiple sets of these data storage elements depending on how many paging channels the BTS 20 defines. Further, although these components are described herein as separate data storage elements, the elements could just as well be physically integrated together or distributed in various other ways. In a preferred embodiment, however, the N slotted queues 114, the non-slotted queue 116, the level of occupancy data 118, the load threshold data 120, and the message scheduler flag 122 would be maintained in data storage 108 separate from the program instructions 124, for easy updating and reference by the program instructions 124.

The N slotted queues 114 may contain any slotted messages (e.g., GPMs) received or generated by the BTS 20 for a given paging channel. The number of slotted queues N is preferably equal to the number of time slots in each cycle of the paging channel (e.g., 32 or 64), and each of the slotted queues 114 preferably corresponds to one specific time slot in the paging channel cycle. As such, each slotted queue 114 preferably contains an identifier of the time slot to which it corresponds. When the BTS 20 receives or generates a slotted message, the BTS 20 may then place the slotted message in the slotted queue 114 that corresponds to the slotted message's time slot. The non-slotted queue 116, on the other hand, may contain all non-slotted messages (e.g., ACKs, CAMs, DBMs) received or generated by the BTS 20 for the given paging channel. As such, when the BTS 20 receives or generates a non-slotted message, the BTS 20 may place the non-slotted message in the non-slotted queue 116 together with all other non-slotted messages for the paging channel.

Each queue (slotted and non-slotted) can take various forms in data storage 108. By way of example, each queue can be a simple linked list of data records, where each record defines or is otherwise indicative of a respective page message. The size of each queue could vary from time to time depending on how many page messages are currently contained in the queue. Alternatively, each queue could be considered memory space reserved to hold page messages. Further, the queues may function as First In First Out (FIFO) queues, Last In First Out (LIFO) queues, and/or priority queues. However, in the preferred embodiment, the queues will function as FIFO queues.

The level of occupancy data 118 may contain information relating to the level of occupancy of a given paging channel. For example, the level of occupancy data 118 will preferably contain a single value representing the current level of occupancy of the paging channel (e.g., expressed as a percentage, fraction, or decimal). In addition, the level of occupancy data 118 may also contain values relating to the process of computing the level of occupancy, including but not limited to (i) a current transmission rate of messages over the paging channel (e.g., expressed in kilobits per second or messages per second), (ii) a maximum transmission rate of the paging channel (e.g., expressed in kilobits per second or messages per second), (iii) a duration of a measurement period (e.g., expressed in seconds) for computing the current transmission rate, and (iv) an amount of data transmitted over the paging channel during one or more previous measurement periods (e.g., kilobits or messages). Further, the level of occupancy data 118 may contain values relating to the level of occupancy of all page messages, only slotted messages, and/or only non-slotted messages.

The load threshold data 120 may contain information relating to the load threshold of a given paging channel. For example, the load threshold data 120 will preferably contain a single value representing the current load threshold of the paging channel (e.g., expressed as a percentage, fraction, or decimal). This current load threshold may be based on either (i) a predicted probability (P) of non-slotted messages that will result from slotted messages transmitted over the paging channel, which is static, or (ii) a ratio (R) of non-slotted messages to slotted messages in the queues of the BTS 20, which is dynamic. If the load threshold is based on the predicted probability (P), the load threshold data 120 may additionally contain a value representing the predicted probability (e.g., expressed as a percentage, fraction, or decimal). Alternatively, if the load threshold is based on the ratio (R), the load threshold data 120 may additionally contain values relating to the process of computing the load threshold, including but not limited to (i) a most recently measured ratio, (ii) one or more previously measured ratios, (iii) a weighted running average of the ratio after the most recent measurement, and/or (iv) an average ratio after the most recent measurement, based on a certain number of previously measured ratios (e.g., all expressed as percentages, fractions, or decimals).

The message scheduler flag 122 preferably contains an indication of the operating mode of the BTS's message scheduling logic or enhanced scheduler 112. As described in more detail below, the message scheduling logic (or enhanced scheduler 112) may operate in two modes: Standard and Overload. As such, the message scheduler flag 122 may contain indication of the current operating mode, and the message scheduling logic (or enhanced scheduler 112) may refer to the message scheduler flag 122 before carrying out its functions. The message scheduler flag 122 may represent the operating mode in data storage 108 in a variety of ways, including but not limited to a binary code (e.g., 0=Standard, 1=Overload) and/or a text string (e.g., "Standard" and "Overload"). Preferably, the BTS 20 will initially set the message scheduler flag 122 to "Standard" mode.

The program instructions 124 may take the form of a set of program logic that can be executed or interpreted by processor 106 to carry out functions of the exemplary embodiment. The program instructions 124 may include, without limitation, message queuing logic, load determination logic, load threshold determination logic, load comparison logic, and/or message scheduling logic. It should be understood, however, that the program logic and its associated functions are described herein by way of example only. As such, those skilled in the art will appreciate that other program logic and/or functions may be used instead, some program logic and/or functions may be added, and some program logic and/or functions may be omitted altogether. Further, as noted above, the various functions described herein can alternatively be embodied in hardware and/or firmware. For example, the BTS 20 may include the enhanced scheduler 112 (e.g., a DSP chip, ASIC, or other component or combination of components), which may carry out the functions of the exemplary embodiment in place of or in conjunction with the processor 106 executing the program instructions 124.

The program instructions 124 may include message queuing logic that defines a mechanism to allow the BTS 20 to queue page messages in the slotted queues 114 and the non-slotted queue 116. In typical operation, the message queuing logic will initiate after the BTS 20 receives or generates a page message, and the message queuing logic may first cause the BTS 20 to determine, based on the page message's contents, whether the page message is a slotted or non-slotted message.

If the page message is a slotted message (e.g., GPM), the message queuing logic may then cause the BTS 20 to (i) determine the slotted message's time slot, (ii) identify the slotted queue 114 that corresponds to that time slot, and (iii) queue the slotted message in the corresponding slotted queue 114. The BTS 20 will preferably determine the slotted message's time slot by identifying the destination(s) of the slotted message (based on the content of the message) and then determining which time slot the destination(s) monitor. For example, if the slotted message contains an IMSI of a destination mobile station 14, the BTS 20 may perform a hash function on the IMSI to determine the destination mobile station's time slot. Alternatively, the BTS 20 may maintain in data storage 110 a lookup table of mobile station 14 identifiers and corresponding time slots, and the BTS 20 may refer to the lookup table to determine the mobile station's time slot. Other methods for determining the slotted message's time slot may be possible as well. Once the BTS 20 determines the slotted message's time slot, the BTS 20 may then identify the slotted queue 114 corresponding to that time slot. If each slotted queue 114 in data storage 108 contains an identifier of its corresponding time slot, the BTS 20 may carry out this function by (i) locating the identifier in each slotted queue 114 and (ii) comparing each identifier to the slotted message's time slot until the BTS 20 identifies the corresponding slotted queue 114. Thereafter, the BTS 20 may store the slotted message in the identified slotted queue 114 in data storage 108.

Alternatively, if the received page message is a non-slotted message (e.g., ACK, CAM, DBM), the message queuing logic may then cause the BTS 20 to queue the non-slotted message in the non-slotted queue 116 in data storage 108. Preferably, the BTS 20 will queue non-slotted messages in the non-slotted queue 116 without reference to the contents of the message (e.g., destination, type, etc.). However, the BTS 20 may alternatively queue non-slotted messages in the non-slotted queue 116 according to the contents of the message.

The program instructions 124 may also include load determination logic that defines a mechanism to allow the BTS 20 to determine the level of occupancy on a given paging channel. The load determination logic may cause the BTS 20 to determine the level of occupancy periodically, continuously, or in response to a triggering event. Further, the load determination logic will preferably cause the BTS 20 to determine the level of occupancy of slotted messages only, but the BTS 20 may alternatively determine the level of occupancy of all messages, or non-slotted messages only. In a preferred embodiment, the load determination logic may cause the BTS 20 to (i) determine a current transmission rate of message data of a given type (e.g., all page messages, slotted only, non-slotted only) over the paging channel, (ii) determine a maximum transmission rate of the paging channel, (iii) compute a ratio of the current transmission rate to the maximum transmission rate, and (iv) store the ratio in data storage 108 as level of occupancy data 118.

The BTS 20 may determine the current transmission rate of message data of the given type in a variety of ways. For example, the BTS 20 may define a measurement period (e.g., measured in seconds), monitor an amount of message data of the given type transmitted over the paging channel during the measurement period (e.g., measured in kilobits or messages), and divide that amount by the measurement period. As another example, the BTS 20 may (i) define a measurement period, (ii) monitor an amount of message data of the given type transmitted during each measurement period for a specific number of measurement periods, (iii) compute an average amount of message data of the given type transmitted during the measurement period, and (iv) divide the average by the measurement period. Other methods for determining the current transmission rate of message data of the given type may be possible as well. In any case, the BTS 20 may define the measurement period for determining the current transmission rate based on a network administrator's preferences, the characteristics of the network, or some other basis.

The BTS 20 may also determine the maximum transmission rate of the paging channel in a variety of ways. For example, the BTS 20 may refer to a value pre-programmed in data storage 108 that represents the maximum transmission rate of the paging channel of the BTS 20. Alternatively, the BTS 20 may determine a maximum amount of data (e.g., measured in kilobits or messages) that can be transmitted over the paging channel during a specific duration of time (e.g., measured in seconds), and the BTS 20 may then divide the maximum amount of data by the duration of time. Other methods for determining the maximum transmission rate over the paging channel may be possible as well. In any case, once the BTS 20 has determined the current transmission rate of message data of the given type and the maximum transmission rate, the BTS 20 may compute a ratio of the rates to determine the level of occupancy of messages of the given type on the paging channel and then store the ratio in data storage 108 as level of occupancy data 118.

The program instructions 124 may further include load threshold determination logic that defines a mechanism to allow the BTS 20 to determine the load threshold for a given paging channel. As one example, the load threshold may be based on a predicted probability (P) of non-slotted messages that will result from slotted messages transmitted over the paging channel, and the load threshold determination logic may simply cause the BTS 20 to refer to a value pre-programmed in data storage 108 as load threshold data 120 that represents the load threshold for the paging channel. The pre-programmed load threshold (LT) may comprise an inverse of the summation of the predicted probability (P) and a value of one (i.e., LT=1/(P+1)), or may comprise some other value based on the preferences of a network administrator and/or the characteristics of the network. In this example, the load threshold determination logic will preferably cause the BTS 20 to access the pre-programmed load threshold from data storage 108 in response to the initiation of the load determination logic, but the load threshold determination logic may alternatively cause the BTS 20 to access the pre-programmed load threshold periodically, continuously, or in response to some other triggering event.

As another example, the load threshold may be based on a ratio (R) of non-slotted messages to slotted messages in the queues of the BTS 20, and the load threshold determination logic may cause the BTS 20 to (i) compute a ratio of non-slotted messages to slotted messages in the queues of the BTS 20, (ii) compute the load threshold based on the ratio, and (iii) store the resulting value in data storage 108 as load threshold data 120. In this example, the load threshold determination logic may cause the BTS 20 to determine the load threshold periodically (e.g., every 5 seconds), continuously, or in response to a triggering event (e.g., the initiation of the load determination logic).

The BTS 20 may compute the ratio of non-slotted messages to slotted messages in a variety of ways, all of which may require the BTS 20 to measure the ratio at specific points in time by (i) measuring the number of non-slotted messages in the non-slotted queue 116 at that point in time, (ii) measuring the total number of slotted messages in the slotted queues 114 at that point in time, and (iii) dividing the number of non-slotted messages by the number of slotted messages. As one example, the BTS 20 may compute the ratio by measuring the ratio at one specific point in time (e.g., when the load threshold logic is invoked) and then using that measured ratio as the ratio for computing the load threshold. As another example, the BTS 20 may compute the ratio by measuring the ratio periodically (e.g., every 5 seconds) and calculating the weighted running average of the ratio at each point of measurement. As such, the computed ratio for any measurement point may equal (1−a)*(the instantaneous ratio of non-slotted messages to slotted messages at the measurement point)+(a) *(the computed ratio at the previous measurement point), where (a) is a float number between 0 and 1. As yet another example, the BTS 20 may compute the ratio by measuring the ratio periodically (e.g., every 5 seconds) and calculating the average of the measured ratios over a predetermined number of measurement points. Other methods for computing the ratio of non-slotted messages to slotted messages in the queues of the BTS 20 may be possible as well.

Once the BTS 20 computes the ratio of non-slotted messages to slotted messages, the BTS 20 may then compute the load threshold based on the ratio. The BTS 20 may compute the load threshold (LT) by computing an inverse of the summation of the ratio (R) and a value of one (i.e., LT=1/(R+1)), or the BTS 20 may compute the load threshold according to some other formula that is based on the preferences of a network administrator and/or the characteristics of the network. In any case, once the BTS 20 computes the load threshold, the BTS 20 may then store the resulting value in data storage 108 as load threshold data 120.

The program instructions 124 may further include load comparison logic that defines a mechanism to allow the BTS 20 to compare the level of occupancy on the paging channel with the load threshold for the paging channel. The load comparison logic will preferably cause the BTS 20 to compare the level of occupancy with the load threshold in response to the completion of the load determination logic and/or the load threshold determination logic, but the load comparison logic may alternatively cause the BTS 20 to compare the level of occupancy with the load threshold periodically, continuously, or in response to some other triggering event. Once initialized, the load comparison logic may first cause the BTS 20 to (i) obtain a value for the level of occupancy, (ii) obtain a value for the load threshold, and (iii) compare the value for the level of occupancy with the value for the load threshold. The BTS 20 may obtain the value for the level of occupancy from the level of occupancy data 118 in data storage 108 or directly from the load determination logic. Similarly, the BTS 20 may obtain the value for the load threshold from the load threshold data 120 in data storage or directly from the load threshold determination logic. Once the BTS 20 obtains the values, it may then compare the values to determine whether the level of occupancy exceeds the load threshold.

If the level of occupancy does not exceed the load threshold, the load comparison logic may then cause the BTS 20 to set the message scheduler flag 122 to "Standard" mode (or leave the message scheduler flag 122 unchanged if it already represents "Standard" mode). Alternatively, if the level of occupancy does exceed the load threshold, the load comparison logic may then cause the BTS 20 to set the message scheduler flag 122 to "Overload" mode (or leave the message scheduler flag 122 unchanged if it already represents "Overload" mode).

The program instructions 124 may finally include message scheduling logic that defines a mechanism to allow the BTS 20 to more efficiently schedule the transmission of page messages over the paging channel to the mobile stations 14. The message scheduling logic preferably causes the BTS 20 to schedule the transmission of page messages continuously, but the message scheduling logic may alternatively cause the BTS 20 to schedule the transmission of page messages periodically, or in response to a triggering event.

The message scheduling logic may operate in two modes: Standard and Overload. As such, the message scheduling logic may first cause the BTS 20 to determine the operating mode (e.g., Standard or Overload). The message scheduling logic may cause the BTS 20 to determine the operating mode at the beginning of each cycle of the paging channel, at the beginning of each time slot, or at some other time. However, for purposes of illustration, this specification will assume the BTS 20 determines the operating mode at the beginning of each paging channel cycle and then operates in that mode for the entire cycle. The BTS 20 may determine the operating mode by referring to the message scheduler flag 122 in data storage 108, the BTS 20 may determine the operating mode directly from the load comparison logic, or BTS 20 may determine the operating mode according to some other method. Once the BTS 20 determines the operating mode, the message scheduling logic may then cause the BTS 20 to carry out the message scheduling functions according to the determined operating mode.

If the determined operating mode is "Standard" mode, the message scheduling logic may cause the BTS 20 to schedule the transmission of page messages by assigning slotted messages a higher transmission priority than non-slotted messages. For example, during the first time slot of the paging cycle, the message scheduling logic may first cause the BTS 20 to transmit (via the antenna structure 102) any slotted messages in the slotted queue 114 corresponding to the first time slot. If the first time slot ends before the BTS 20 transmits all of the slotted messages in the first time slot's queue 114, the BTS 20 may not transmit any non-slotted messages in the non-slotted queue 116 during the first time slot. Alternatively, if there are no slotted messages in the first time slot's queue 114 or the BTS 20 transmits all of the slotted messages in the first time slot's queue 114 before the first time slot ends, the BTS 20 may then transmit non-slotted messages from the non-slotted queue 116 until the end of the first time slot. Alternatively yet, if the BTS 20 serves all of the slotted messages in the first time slot's queue 114 and all of the non-slotted messages in the non-slotted queue 116 before the first time slot ends, the BTS 20 may not transmit any more page messages until the first time slot ends. In any case, once the first time slot ends, the BTS 20 may then transmit page messages during the second time slot, and any subsequent time slots, according to same process. Further, after the last time slot in the cycle, the message scheduling logic may then cause the BTS 20 to start the process over by determining the operating mode.

Alternatively, if the determined operating mode is "Overload" mode, the message scheduling logic may cause the BTS 20 to schedule the transmission of page messages by assigning non-slotted messages a higher transmission priority than slotted messages. For example, during the first time slot of the paging cycle, message scheduling logic may first cause the BTS 20 to transmit (via the antenna structure 102) any non-slotted messages in the non-slotted queue 116. If the first time slot ends before the BTS 20 transmits all of the non-slotted messages in the non-queue 116, the BTS 20 may not transmit any slotted messages in the slotted queue 114 corresponding to the first time slot during the first time slot. Alternatively, if there are no non-slotted messages in the non-slotted queue 116 or the BTS 20 transmits all of the non-slotted messages in the non-slotted queue 116 before the first time slot ends, the BTS 20 may then transmit slotted messages from the first time slot's queue 114 until the end of the first time slot. Alternatively yet, if the BTS 20 serves all of the non-slotted messages in the non-slotted queue 116 and all of the slotted messages in the first time slot's queue 114 before the first time slot ends, the BTS 20 may not transmit any more page messages until the first time slot ends. In any case, once the first time slot ends, the BTS 20 may then transmit page messages during the second time slot, and any subsequent time slots, according to same process. Further, after the last time slot in the cycle, the message scheduling logic may then cause the BTS 20 to start the process over by determining the operating mode.

Figure 6:
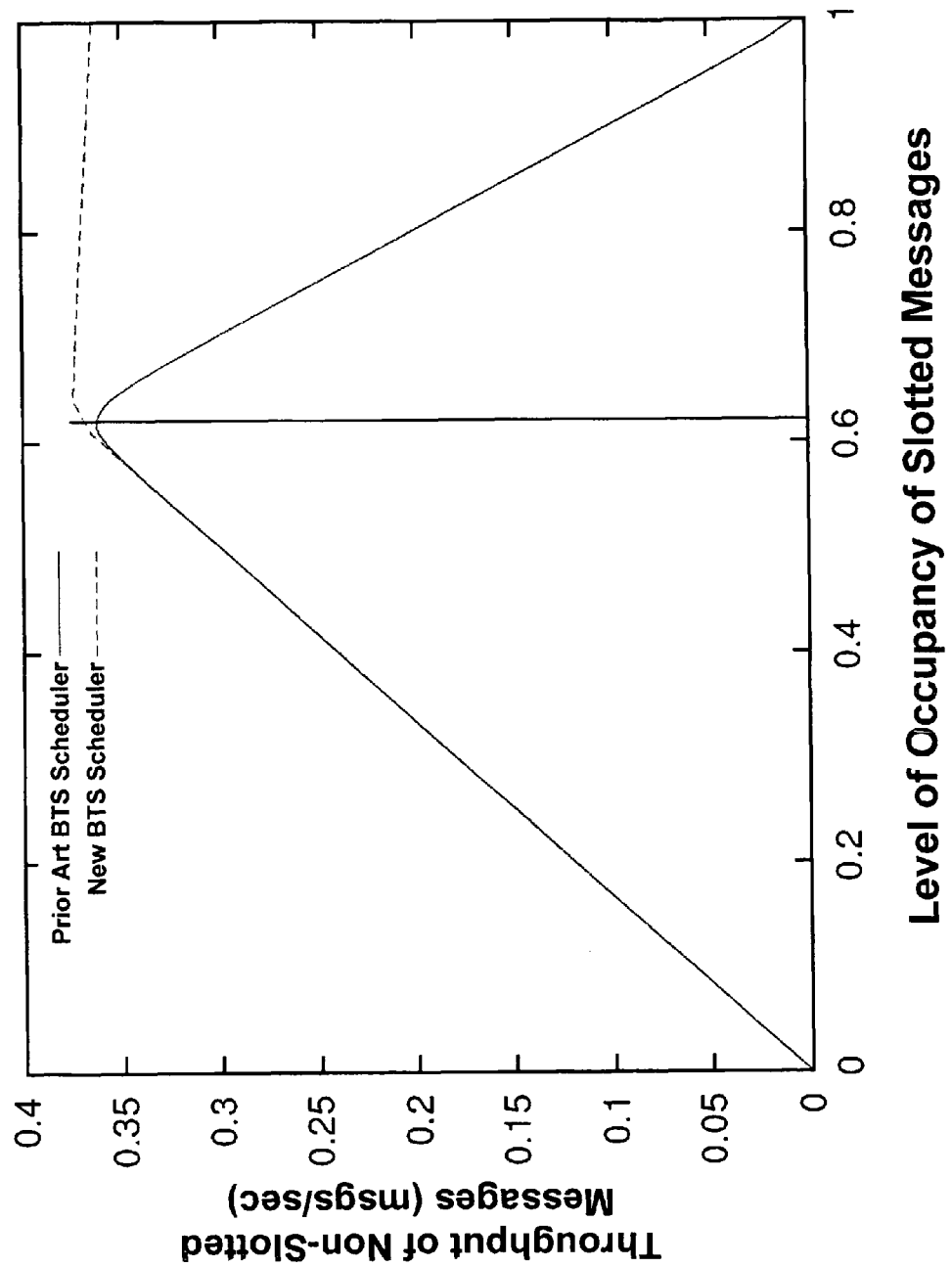
FIG. 6 depicts the throughput performance of both a prior art base transceiver station scheduler and a base transceiver scheduler arranged to carry out an exemplary embodiment of the present invention.

As stated above, the functions of the present invention may be carried out by program instructions 124 executed or interpreted by the processor 106, or may be carried out by a separate logic component, such as the enhanced scheduler 112. In either case, the present invention advantageously assigns a higher transmission priority to non-slotted messages—the messages that complete the paging process and establish a real communication—when the level of occupancy of slotted messages on the paging channel increases to a critical point. According to simulations, that critical point may be 1/(1+p), where p is either (i) the predicted probability (P) of non-slotted messages that will result from slotted messages transmitted over the paging channel or (ii) the ratio (R) of non-slotted messages to slotted messages in the queues of the BTS 20. FIG. 6 depicts the throughput performance of both a prior art BTS scheduler and a BTS scheduler arranged to carry out an exemplary embodiment of the present invention. The graph in FIG. 6 displays the throughput of non-slotted messages as a function of the level of occupancy of slotted messages on the paging channel, and p is estimated at 0.6, making the critical point 0.625. As shown, with the prior art BTS scheduler, the throughput of non-slotted messages may decrease significantly after the level of occupancy of slotted messages reaches the critical point. In turn, the amount of communications established via the paging channel may also decrease significantly. Alternatively, with the new BTS scheduler, the throughput of non-slotted messages may level off after the critical point, but may not decrease significantly. In turn, the amount of communications established via the paging channel may remain at an acceptable level, and the overall performance of the network 10 may not suffer.

Exemplary embodiments of the present invention have been described above. Those skilled in the art will understand, however, that changes and modifications may be made to the embodiments described without departing from the true scope and spirit of the present invention, which is defined by the claims.

The invention claimed is:

1. A method for scheduling transmission of slotted messages and non-slotted messages on a paging channel defined by a radio access network, wherein the radio access network generally assigns slotted messages a higher transmission priority than non-slotted messages, the method comprising:
   the radio access network determining a level of occupancy of slotted messages on the paging channel;
   the radio access network comparing the level of occupancy to a load threshold and thereby determining that the level of occupancy exceeds the load threshold, wherein the load threshold is based on a ratio of non-slotted messages to slotted messages; and
   the radio access network assigning non-slotted messages a higher transmission priority than slotted messages in response to determining that the level of occupancy exceeds the load threshold.

2. The method of claim 1, wherein slotted messages comprise general page messages and non-slotted messages comprise one or more of:
   acknowledgment messages;
   channel assignment messages; and
   data burst messages.

3. The method of claim 1, wherein the radio access network determining the level of occupancy of slotted messages on the paging channel is selected from the group consisting of:
   the radio access network determining the level of occupancy continuously;
   the radio access network determining the level of occupancy periodically; and
   the radio access network determining the level of occupancy in response to a triggering event.

4. The method of claim 1, wherein the radio access network determining the level of occupancy of slotted messages on the paging channel comprises:
   the radio access network determining a current transmission rate of slotted messages on the paging channel;
   the radio access network determining a maximum rate transmission rate on the paging channel; and
   the radio access network computing a ratio of the current transmission rate of slotted messages to the maximum transmission rate.

5. The method of claim 4, wherein the radio access network determining the current transmission rate of slotted messages over the paging channel comprises:
   the radio access network monitoring an amount of slotted message data transmitted over the paging channel during a measurement period; and
   the radio access network dividing the amount by the measurement period.

6. The method of claim 1, wherein the ratio of non-slotted messages to slotted messages comprises a predicted probability of non-slotted messages that will result from the transmitted slotted messages in the radio access network.

7. The method of claim 6, wherein the load threshold comprises an inverse of the summation of the predicted probability and a value of one.

8. The method of claim 1, wherein the ratio of non-slotted messages to slotted messages comprises a ratio of non-slotted messages to slotted messages in the radio access network, further comprising the radio access network determining the load threshold based on the ratio of non-slotted messages to slotted messages in the radio access network before comparing the level of occupancy to the load threshold.

9. The method of claim 8, wherein the radio access network determining the load threshold comprises:
   the radio access network computing the ratio of non-slotted messages to slotted messages in the radio access network;
   the radio access network computing an inverse of the summation of the ratio and a value of one.

10. The method of claim 9, wherein the radio access network computing the ratio of non-slotted messages to slotted messages in the radio access network is selected from the group consisting of:
    the radio access network computing the ratio at one point in time;
    the radio access network computing an average of ratios measured over a period of time; and
    the radio access network computing a weighted running average of ratios measured over a period of time.

11. The method of claim 1, wherein the paging channel comprises a plurality of time slots of a given duration, and wherein the radio access network assigning non-slotted messages a higher transmission priority that slotted messages comprises:
    the radio access network transmitting any non-slotted messages during the duration of a given time slot; and
    the radio access network transmitting slotted messages associated with the given time slot during the duration of the given time slot if all non-slotted messages have been transmitted.

12. A method for scheduling transmission of slotted messages and non-slotted messages on a paging channel defined by a radio access network, wherein the paging channel comprises a plurality of time slots of a given duration, and wherein the radio access network generally transmits any slotted messages associated with a given time slot during the duration of the given time slot before transmitting any non-slotted messages during the duration of the given time slot, the method comprising:

the radio access network determining a current transmission rate of slotted messages over the paging channel;

the radio access network determining a maximum rate transmission rate over the paging channel;

the radio access network computing a first ratio of the current transmission rate of slotted messages to the maximum transmission rate;

the radio access network computing a second ratio of non-slotted messages to slotted messages in the radio access network;

the radio access network computing an inverse of the summation of the second ratio and a value of one;

the radio access network comparing the first ratio with the inverse and thereby determining that the first ratio exceeds the inverse; and in response to determining that the first ratio exceeds the inverse, the radio access network transmitting any non-slotted messages during the duration of a given time slot before transmitting slotted messages associated with the given time slot during the duration of the given time slot.

13. A base transceiver station comprising:

an antenna structure for communicating with endpoints via an air-interface;

a base station controller interface for communicating with a base station controller;

a processor, data storage; and program instructions stored in the data storage and executable by the processor to carry out functions including:

determining a level of occupancy of slotted messages on a paging channel defined by the base transceiver station;

comparing the level of occupancy to a load threshold and thereby determining that the level of occupancy exceeds the load threshold, wherein the load threshold is based on a ratio of non-slotted messages to slotted messages; and assigning non-slotted messages a higher transmission priority than slotted messages in response to determining that the level of occupancy exceeds the load threshold.

14. The base transceiver station of claim 13, wherein the ratio of non-slotted messages to slotted messages comprises a ratio of non-slotted messages to slotted messages in the radio access network, further comprising program instructions stored in the data storage and executable by the processor to carry out the function of determining the load threshold based on the ratio before comparing the level of occupancy to the load threshold.

15. The base transceiver station of claim 13, wherein the data storage contains a plurality of slotted message queues, a non-slotted message queue, level of occupancy data, load threshold data, and a message scheduler flag.

16. The base transceiver station of claim 13, further comprising program instructions stored in the data storage and executable by the processor to carry out functions including:

storing slotted messages in data storage according to a time slot of the paging channel associated with the slotted message;

storing non-slotted messages in data storage;

storing a value representing the level of occupancy in data storage;

storing a value representing the load threshold in data storage; and storing an indication of an operating mode of the base transceiver station in data storage, wherein the base transceiver station may operate in standard mode or overload mode.

17. The base transceiver station of claim 13, wherein the processor executes the program instructions for carrying out the function of determining the level of occupancy periodically, and wherein the processor executes the program instructions for carrying out the function of comparing the level of occupancy to the load threshold in response to determining the level of occupancy.

* * * * *